Aug. 27, 1968   D. J. HARDY ET AL   3,398,712
FLEXIBLE SKIRTS FOR AIR CUSHION VEHICLES
Filed Aug. 22, 1966   3 Sheets-Sheet 1

United States Patent Office 3,398,712
Patented Aug. 27, 1968

3,398,712
FLEXIBLE SKIRTS FOR AIR
CUSHION VEHICLES
Derek James Hardy, Cowes, Isle of Wight, and Lavis Albert Henry Riddle, East Cowes, Isle of Wight, England, assignors to Westland Aircraft Limited, Yeovil, England
Filed Aug. 22, 1966, Ser. No. 573,959
Claims priority, application Great Britain, Sept. 24, 1965, 40,882/65
10 Claims. (Cl. 114—67)

ABSTRACT OF THE DISCLOSURE

A flexible skirting assembly for a vehicle which, during one phase of operation, is wholly or partially supported on at least one cushion of pressurized gaseous fluid formed beneath the vehicle, and during another phase of operation acts as a displacement vessel, comprises a flexible, fluid-impermeable duct having orifices for the discharge of gaseous fluid adjacent the lower portion thereof. The flexible duct acts as at least part of the barrier to the escape of the pressurized gaseous fluid cushion by which the vehicle is supported, and as a passage to conduct the pressurized gaseous fluid to the discharge orifices. At least one flexible membrane within the duct defines an inflatable compartment which, when inflated, converts the skirting assembly into a buoyancy chamber, and closes off the discharge orifices and the gaseous fluid inlet to the flexible duct.

---

Figure 1:
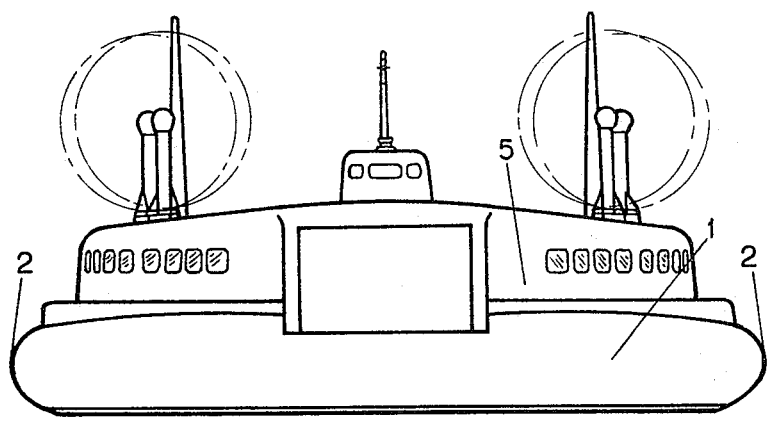

This invention relates to vehicles which, during one phase of operation, are wholly or partly supported on at least one cushion of pressurized gaseous fluid, and in another phase of operation, are adapted to operate as displacement water craft. It is with flexible skirting assemblies for such vehicles that this invention is more particularly concerned.

It is known to provide such a vehicle with two individual skirting assemblies, which act as barriers to the dissipation of the pressurized air cushion, and as extensions to the ducting which conveys pressurized air to the air cushion, and buoyant hulls, so that the vehicle may operate as either an air cushion vehicle or a displacement water craft. Such skirting assemblies and buoyant hulls are arranged so that either may be retracted to allow the other to operate without interference.

According to one aspect of the present invention, we provide a flexible skirting assembly for a gaseous fluid cushion supported vehicle, wherein at least part of said skirting assembly, through which air passes to form the cushion, is capable of being converted to a sealed buoyancy chamber, enabling the vehicle to operate as a displacement craft.

According to another aspect of the invention, we provide a flexible skirting assembly for a vehicle which, during one phase of operation, is wholly or partially supported on at least one cushion of pressurized gaseous fluid formed beneath said vehicle, and during another phase of operation acts as a displacement vessel, wherein, when it is desired to operate the vehicle as a displacement vessel, at least part of said skirting assembly is convertible, by means disposed within said skirting assembly, from a flexible barrier which retards the dissipation of said cushion, and through which gaseous fluid passes to form said cushion, into at least one sealed buoyancy chamber.

According to a further aspect of the invention, we provide a dual purpose flexible assembly depending from the structure of an air cushion vehicle, consisting of a flexible, fluid-impermeable duct having at least one discharge orifice in the lower portion thereof, said duct, in one of the roles of the vehicle, acting as at least part of the barrier to the escape of the pressurized gaseous fluid cushion or cushions by which the vehicle is supported, and as a passage to conduct the pressurized gaseous fluid to at least one discharge orifice, said flexible assembly further including at least one inner flexible membrane within the duct, which, in co-operation with a part of said duct provides, in another of the roles of the vehicle, at least one compartment which, when inflated, converts said skirting assembly into at least one buoyancy chamber.

In yet another aspect of the invention, we provide a flexible skirting assembly for a vehicle which, during one phase of operation, is wholly or partly supported on at least one cushion of pressurized gaseous fluid and, during another phase of operation, acts as a displacement water craft, said flexible skirting assembly depending below the vehicle and including an outer flexible membrane substantially impervious to fluid, said outer flexible membrane being attached to said vehicle at points inboard and outboard of a gaseous fluid supply ducting, and being furnished with at least one discharge orifice in the lower portion thereof, so as to permit the passage of gaseous fluid from said gaseous fluid supply ducting to said cushion of gaseous fluid, said flexible skirting assembly further including at least one flexible, substantially gaseous fluid-impermeable, inner membrane, such membrane extending from an uppermost point of attachment to said vehicle, positioned between the gaseous fluid supply ducting and the point of atttachment of the outer membrane to said vehicle, to a lowermost point of attachment on the outer flexible membrane, so as to form at least one substantially fluidtight compartment defined by said inner membrane and a portion of the outer membrane, each compartment having, in communication therewith, inlet means through which gaseous fluid is introduced to the interior thereof, and outlet means through which the compartment is exhausted, said inner membrane being arranged so that, when the compartment is inflated, said membrane closes said discharge orifice, and said gaseous fluid supply ducting, to form at least one buoyancy chamber.

The provision of an inner membrane or membranes arranged to form a buoyant member may be limited to those parts of the skirting assembly which are substantially parallel to the longitudinal axis of the vehicle, and these parts may be separated from the remainder of the skirting assembly by fluid-impermeable diaphragms transversely arranged within the skirting assembly. With such an arrangement, the inflated buoyant members, in co-operation with the rigid part of the vehicle, may form a displacement water craft of the catamaran, trimaran, or multi-hulled type.

The bow and stern portions of the skirting assembly may be divided into a plurality of independent contiguous segments arranged to be moved, for example, by retracting upwards, towards the rigid body of the vehicle, so that they are clear of the water or obstructions passing between the buoyant side members, when the vehicle is in a catamaran configuration.

The inlet means and the outlet means may be combined as one duct communicating with each compartment. Such inlet and outlet means, whether combined or separate, may be provided with valves, so as to control the influx of gaseous fluid to each of the chambers, and to control the efflux of gaseous fluid from such chambers.

Figure 2:
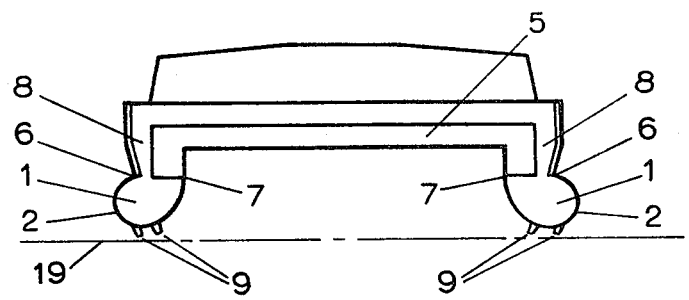
Figure 3:
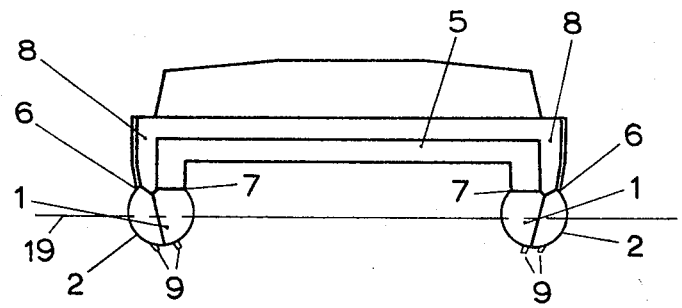
Figure 4:
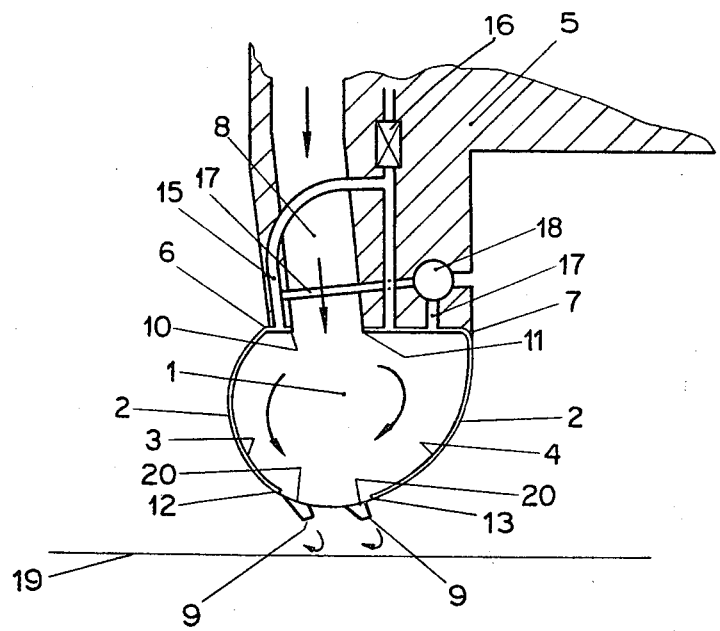
Figure 5:
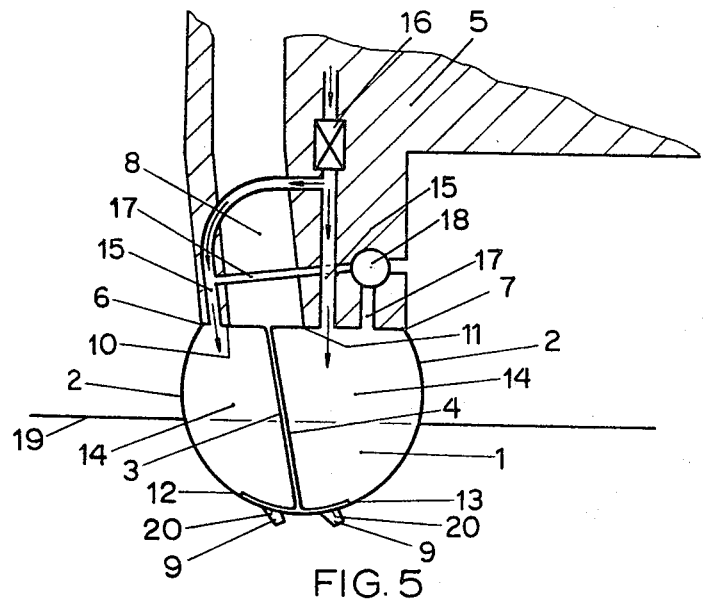
Figure 6:
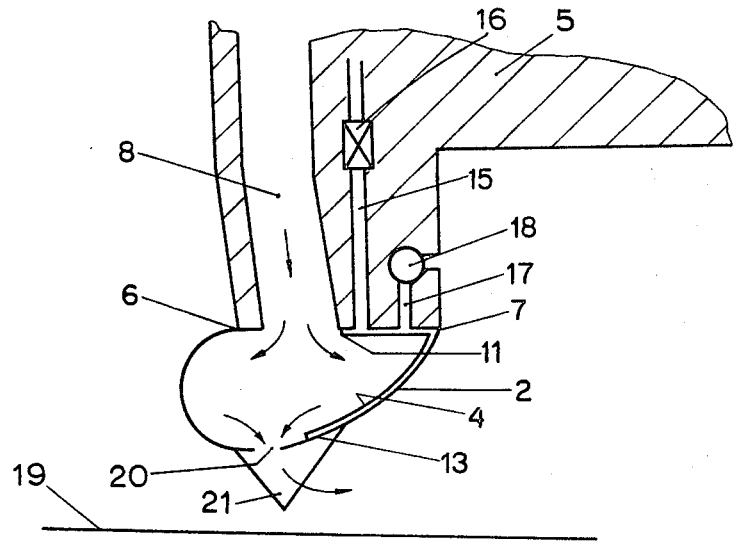

Examples of the invention will be described with reference to accompanying drawings, in which:

FIGURE 1 is the bow end elevation of a typical dual-purpose vehicle according to the invention, FIGURE 2 is a diagrammatic section, on a different scale, of the vehicle illustrated in FIGURE 1, in the hover attitude, FIGURE 3 is a diagrammatic section of the same vehicle as in FIGURE 2, in the displacement attitude, FIGURE 4 is a fragmentary dagrammatic cross-section of one embodiment of the invention, showing the skirting assembly in the hover attitude, FIGURE 5 shows the skirting assembly of FIGURE 4, in the displacement attitude, and FIGURE 6 is a fragmentary diagrammatic cross-section of a skirting assembly according to another embodiment of the invention.

In carrying the invention into effect, according to a preferred method, we provide a dual-purpose vehicle, generally illustrated in FIGURE 1. This vehicle is furnished with a skirting assembly 1, which includes an outer membrane of flexible, air-impermeable material 2, and two inner membranes of flexible air-impermeable material 3 and 4 (see FIGURE 4). The outer membrane 2 is attached to the rigid part 5 of the vehicle at points 6, which are outboard of, and points 7, which are inboard of, the air supply ducting 8. The outer membrane 2 is provided, in the lower portion thereof, with discharge orifices 20 and discharge nozzles 9. Thus, the outer membrane 2 provides an air passage from the ducting 8 in the rigid part 5 of the vehicle to the discharge nozzles 9, and effectively extends the ducting 8.

Each inner membrane 3 and 4 is attached, at its upper end, to the rigid part 5 of the vehicle at points 10 and 11 respectively, which are between the air supply ducting 8 and the respective points of attachment 6 and 7 of the outer membrane to the vehicle. The lowermost edges of the inner membranes 3 and 4 are attached to the outer membrane 2 close to the nozzles 9, at points 12 and 13 respectively. The voids between each inner membrane 3 or 4, and the associated portion of the outer membrane 2, constitute fluidtight compartments 14, shown in the pressurized state in FIGURE 5.

Each fluidtight compartment 14 has, in communication therewith, inlet means 15, which include a non-return valve 16, through which pressurized gaseous fluid is fed from a suitable supply source, such as a compressor. Also, the compartments have associated therewith outlet ports 17, which include a pressure regulating valve and deflation means 18, so as to control the efflux of gaseous fluid from the compartments 14.

In operation, when it is desired that the vehicle be supported on a cushion or cushions or pressurized air, pressurized air is fed via the supply ducting 8 into the skirting assembly 1, and issues from the nozzles 9, in order to generate and/or maintain the supporting cushion or cushions of pressurized air. The pressure of the air within the ducting maintains the inner membranes 3 and 4 in contact with the adjacent portion of the outer membrane 2. In this condition, the vehicle takes up a position above the surface over which it is operating, indicated by the water line 19, in FIGURES 2 and 4.

When it is required that the vehicle should operate as a displacement water craft, the air supply to the air ducting 8 is shut off, and, at the same time, gaseous fluid at a pressure higher than that supplied to the air supply ducting 8 is admitted into the compartments 14 via the non-return valve 16 and inlet means 15. This high pressure gaseous fluid causes the inner membranes 3 and 4 to move away from the adjacent portions of the outer membrane 2, and to abut against one another, as illustrated in FIGURES 3 and 5. In this position, the inner membranes 3 and 4 close the air supply ducting 8 and the nozzles 9, and the two compartments 14 together form a buoyancy chamber Pressure in the compartments 14 is regulated by the pressure regulator and blow-off valve 18, and when transition from the displacement role to the hovering role is required, this valve 18 is actuated, to allow the pressure to exhaust into the air cushion area.

It will be apparent that each compartment 14 may be fed from an individual source of pressurized air, and may be provided with an individual non-return valve and pressure regulating valve. Alternatively, any suitable combination of pressurized air sources, non-return valves, pressure regulating valves, and blow-off valves, may be provided.

It will be apparent also that, although the embodiment described teaches the use of two inner membranes, 3 and 4, either a single membrane or a different combination of a plurality of membranes could be employed, such membrane or membranes being suitably attached, so as to provide means for sealing off the gaseous fluid supply ducting and one or more discharge orifices.

Further, other forms of flexible skirting may be employed. For example, FIGURE 6 illustrates a form of combination skirt, in which a flexible pressurized part bounded by an outer membrane 2 is subtended by a plurality of convoluted contiguous segments 21. Such segments have a greater resistance to bending in a plane transverse to the skirting assembly than in a plane parallel to the peripheral axis of the skirting assembly, and may be open or closed on their sides adjacent to the air cushion. At least one discharge orifice 20 in the lower region of the pressurized part of the skirt allows pressurized gaseous fluid, in the case of open-sided segments, to pass to the cushion area, and in the case of closed-sided segments, allows the pressurized gaseous fluid to enter the interior of the segment, whence it is ejected to the air cushion area through a nozzle in the lower part of the segment.

A single internal membrane 4, which takes up a position adjacent to the inner surface of the outer membrane 2 on the side of the skirting assembly that is nearer to the air cushion, when the vehicle is in the air cushion role, may be moved so that it is adjacent to the inner surface of the outer membrane 2, on the side of the skirting assembly that is remote from the cushion area, by pressure from the inlet means 15, to form a buoyant fluidtight chamber. In this condition, the inner membrane 4 seals the gaseous fluid supply ducting 8 and the discharge orifice 20.

Diaphragms may be provided to maintain the outer membrane 2 in a desired cross-sectional shape. Also, each fluidtight compartment 14 may be divided into sections by the provision of fluidtight ends connecting the inner membranes 3 and 4 to the outer membrane 2. In the latter arrangement, the opposing ends of each section may be connected by suitable members, which bias the ends to fold inwards into the section when the compartment 14 is deflated.

The embodiments described and shown herein are merely presented by way of example. The invention may, of course, be employed on any vehicle having a flexible skirting assembly, in which there is a requirement to close discharge nozzles, and variations or modifications can be effected, without departing from its scope. For example, the invention need not be limited to the illustrated twin nozzle arrangement which provides a secondary air cushion between the nozzles, for stability purposes. Any suitable nozjle configuration may be employed, and other stability arrangements provided. Thus, the skirting assembly hereinbefore described may also be adapted to provide stability compartmentation barriers.

We claim as our invention:

1. A flexible skirting assembly for a vehicle which, during one phase of operation, is wholly or partly supported on at least one cushion of pressurized gaseous fluid, and, during another phase of operation, acts as a displacement water craft, said flexible skirting assembly depending below the vehicle and including an outer flexible membrane substantially impervious to fluid, said outer flexible membrane being attached to said vehicle at points inboard and outboard of a gaseous fluid supply ducting, and being furnished with at least one discharge orifice in the lower portion thereof, so as to permit the passage of gaseous fluid from said gaseous fluid supply ducting to said cushion of gaseous fluid, said flexible skirting assembly further including at least one flexible, substantially gaseous fluid-impermeable, inner membrane which extends from an uppermost point of attachment to said vehicle positioned between the gaseous fluid supply ducting and the point of attachment of the outer membrane to said vehicle, to a lowermost point of attachment on the outer flexible membrane, so as to form at least one substantially fluidtight compartment defined by said inner membrane and a portion of the outer membrane, each such compartment having, in communication therewith, inlet means through which gaseous fluid is introduced to the interior thereof, and outlet means through which the compartment is exhausted, said inner membrane being arranged so that, when the compartment is inflated, said membrane closes said discharge orifice and said gaseous fluid supply ducting to form at least one buoyancy chamber.

2. A flexible skirting assembly depending from the perimetric region of a vehicle which, in one role, acts as an air cushion vehicle, and in another role acts as a displacement water craft, said skirting assembly consisting, in operation, of an upper pressurized part, from which depends a lower segmented part, consisting of a plurality of convoluted contiguous segments having a greater resistance to bending in a plane transverse to the skirting assembly than in a plane parallel to the peripheral axis of the skirting assembly, the upper pressurized part including at least one discharge orifice in its lower region, and at least one inner flexible membrane arranged to seal an inlet to the upper pressurized part and the discharge orifice, to form at least one buoyancy chamber.

3. A flexible skirting assembly as claimed in claim 1, wherein the buoyancy chamber is inflated from a source separate from that supplying the cushion.

4. A flexible skirting assembly as claimed in claim 1, wherein the pressure in the buoyancy chamber is higher than that supplying the air cushion.

5. A flexible skirting assembly as claimed in claim 3 wherein at least one duct through which the buoyancy chamber is deflated has an outlet to the air cushion area.

6. A flexible skirting assembly depending from a vehicle which, in one role, acts as an air cushion vehicle, and in another role acts as a displacement watercraft, said skirting assembly comprising, in operation, a flexible-walled pressurized part including at least one discharge orifice in its lower region and air inlet means through which pressurized air is admitted to the interior thereof to be discharged through said discharge orifice, and means located in said pressurized part for selectively sealing off said inlet means and said discharge orifice to form at least one buoyancy chamber in said pressurized part.

7. Apparatus as claimed in claim 6 wherein said means located in said pressurized part comprises at least one flexible membrane.

8. Apparatus as claimed in claim 7 wherein said flexible membrane forms, with a portion of the wall of said pressurized part, a fluid-tight compartment having inlet means through which gaseous fluid is introduced to the interior thereof to form a buoyancy chamber.

9. Apparatus as claimed in claim 6 wherein said means located in said pressurized part comprises flexible membrane means defining, at least in part, inflatable and deflatable fluid-tight compartment means for, when inflated, filling substantially the entire volume of said pressurized part, and sealing off said inlet means and said discharge orifice.

10. A flexible skirting assembly depending from a vehicle which, in one role, acts as an air cushion vehicle, and in another role acts as a displacement watercraft, said skirting assembly comprising, in operation, a flexible-walled pressurized part including at least one discharge orifice in its lower region and air inlet means through which pressurized air is admitted to the interior thereof to be discharged through said discharge orifice, and flexible membrane means in said pressurized part defining, at least in part, inflatable and deflatable fluid-tight compartment means for, when inflated, filling substantially the entire volume of said pressurized part and forming a buoyancy chamber therein.

References Cited

UNITED STATES PATENTS

| 2,598,207 | 5/1952 | Bailey et al. | 251—61.1 |
| 2,960,281 | 11/1960 | Jumelle et al. | 239—265.43 |
| 3,253,666 | 5/1966 | Kiernan et al. | 180—7 |
| 3,269,349 | 8/1966 | Gehlen | 115—1 |
| 3,275,270 | 9/1966 | Earl et al. | 180—7 |

FOREIGN PATENTS

| 935,620 | 8/1963 | Great Britain. |

ANDREW H. FARRELL, *Primary Examiner.*